US010969991B2

(12) United States Patent
Chen et al.

(10) Patent No.: US 10,969,991 B2
(45) Date of Patent: Apr. 6, 2021

(54) MULTI-CHIP PACKAGE, CONTROLLING METHOD OF MULTI-CHIP PACKAGE AND SECURITY CHIP (71) Applicant: MACRONIX INTERNATIONAL CO., LTD., Hsinchu (TW)

(72) Inventors: Chia-Jung Chen, Zhubei (TW); Chin-Hung Chang, Tainan (TW); Ken-Hui Chen, Dali (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 157 days.

(21) Appl. No.: 15/998,456

(22) Filed: Aug. 15, 2018

(65) Prior Publication Data
US 2020/0057575 A1 Feb. 20, 2020

(51) Int. Cl.
*G06F 3/06* (2006.01)

(52) U.S. Cl.
CPC ............ *G06F 3/0655* (2013.01); *G06F 3/061* (2013.01); *G06F 3/0679* (2013.01)

(58) Field of Classification Search
None
See application file for complete search history.

(56) References Cited

U.S. PATENT DOCUMENTS

| 10,129,035 B2 | 11/2018 | Gulati et al. | |
|---|---|---|---|
| 2005/0144468 A1* | 6/2005 | Northcutt | G06F 21/10 713/189 |
| 2010/0031059 A1* | 2/2010 | Laackmann | G06F 12/1458 713/193 |
| 2012/0036351 A1* | 2/2012 | Peet, Jr. | G06F 15/167 713/150 |
| 2012/0110246 A1* | 5/2012 | Rolandi | G11C 16/26 711/103 |
| 2013/0016832 A1* | 1/2013 | Yamashita | G06F 21/606 380/44 |
| 2013/0031375 A1* | 1/2013 | Lin | G06F 21/76 713/192 |

(Continued)

FOREIGN PATENT DOCUMENTS

| TW | M467123 U | 12/2013 |
| TW | 201717092 A | 5/2017 |
| TW | 201738738 A | 11/2017 |

OTHER PUBLICATIONS

TW Office Action dated Oct. 28, 2019 in Taiwan application (107128495).

(Continued)

*Primary Examiner* — Charles Rones
*Assistant Examiner* — Ryan Dare
(74) *Attorney, Agent, or Firm* — McClure, Qualey & Rodack, LLP (57) ABSTRACT A multi-chip package, a controlling method of the multi-chip package and a security chip are provided. The multi-chip package includes a memory chip and a security chip. The security chip is coupled between the memory chip and a host. The security chip includes a processing circuit. The processing circuit is for enabling a security path to input an input-output signal into the processing circuit for executing a security procedure and accessing the memory chip, if a command is received by the processing circuit and the command includes a security requirement.

20 Claims, 6 Drawing Sheets

(56) References Cited

U.S. PATENT DOCUMENTS

| | | | |
|---|---|---|---|
| 2015/0012737 A1* | 1/2015 | Newell | G06F 21/575 |
| | | | 713/2 |
| 2017/0256187 A1* | 9/2017 | Zhang | G09G 3/36 |
| 2019/0036706 A1 | 1/2019 | Detert | |

OTHER PUBLICATIONS

TIPO Office Action dated Mar. 27, 2019 in Taiwan application (No. 107128495).

* cited by examiner

MULTI-CHIP PACKAGE, CONTROLLING METHOD OF MULTI-CHIP PACKAGE AND SECURITY CHIP

TECHNICAL FIELD

The disclosure relates in general to a semiconductor package, an operating method of the semiconductor package and a chip, and more particularly to a multi-chip package, a controlling method of the multi-chip package and a security chip.

BACKGROUND

Along with the development of memory, various memories are invented. For example, Flash, ReRAM, EPROM, PCM can be used for different applications.

Those memories can be used to store digital data. Those digital data is easily to read or transmit. Some security information may be stolen by other people. Therefore, how to ensure the information security is an important issue nowadays.

SUMMARY

The disclosure is directed to a multi-chip package, a controlling method of the multi-chip package and a security chip. The security chip and a memory chip are packed to be the multi-chip package. A security path can be controlled to be enabled for executing a security procedure. A control path can be controlled to be enabled for passing a control signal to the memory chip if the security procedure is successfully performed. As such, the security chip can ensure the information security of the memory chip, and the memory chip can provide extra data region for the security chip to execute the security procedure.

According to one embodiment, a controlling method of a multi-chip package is provided. The multi-chip package includes a memory chip and a security chip. The controlling method includes the following steps: A command is received from a host by a processing circuit of the security chip. A security path is enabled to input an input-output signal into the processing circuit for executing a security procedure and accessing the memory chip, if the command includes a security requirement.

According to another embodiment, a multi-chip package is provided. The multi-chip package includes a memory chip and a security chip. The security chip is coupled between the memory chip and a host. The security chip includes a processing circuit. The processing circuit is for enabling a security path to input an input-output signal into the processing circuit for executing a security procedure and accessing the memory chip, if a command is received by the processing circuit and the command includes a security requirement.

According to an alternative embodiment, a security chip is provided. The security chip includes a processing circuit. The processing circuit is for enabling a security path to input an input-output signal into the processing circuit for executing a security procedure and accessing a memory chip, if a command is received from a host by the processing circuit and the command includes a security requirement.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
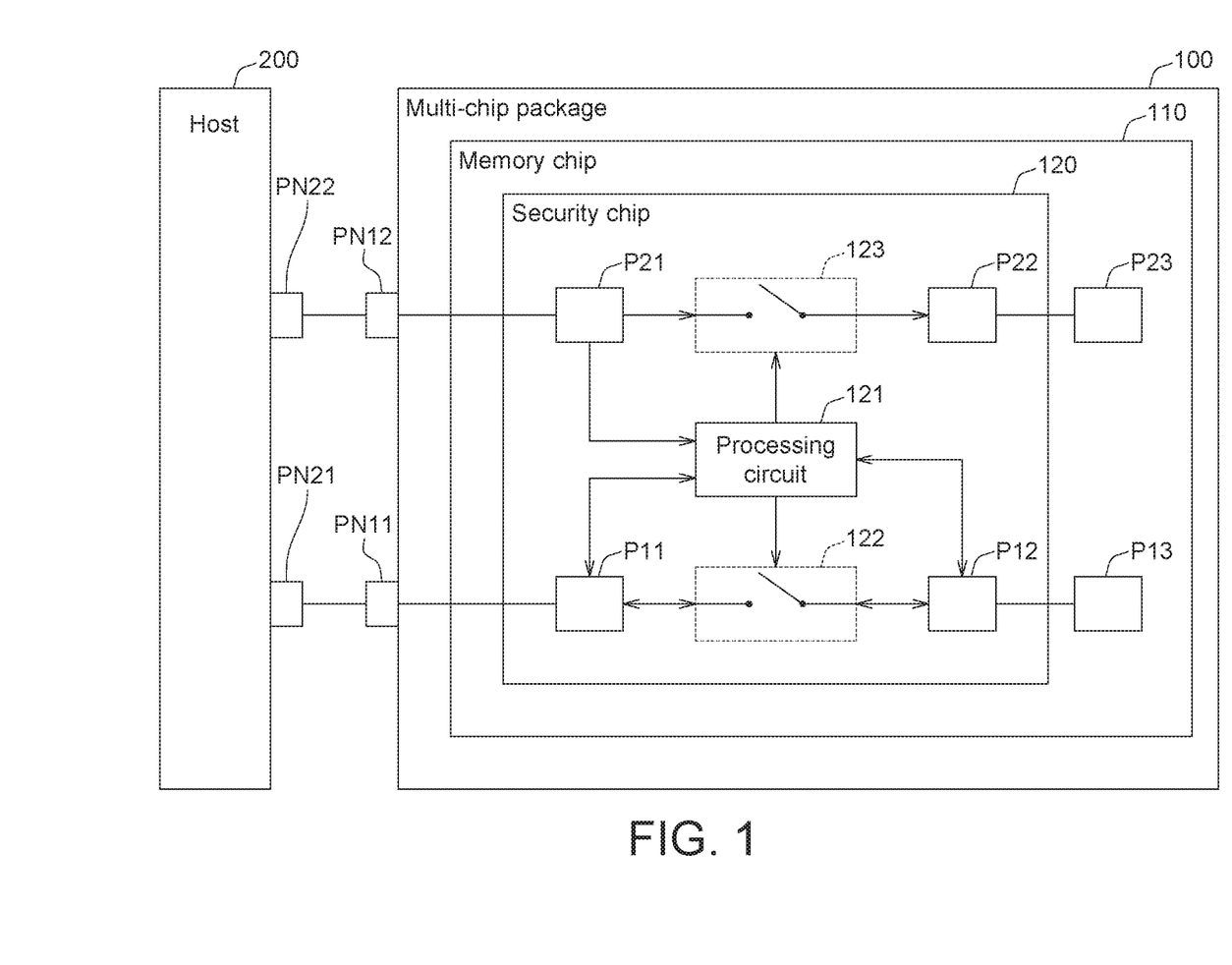
FIG. 1 shows a multi-chip package and a host according to one embodiment.

Refer to FIG. 1, which shows a multi-chip package 100 and a host 200 according to one embodiment. The multi-chip package 100 includes at least one input-output pin PN11, at least one control pin PN12, a memory chip 110 and a security chip 120. The number the input-output pin PN11 and the control pin PN12 may be one or more than one. In FIG. 1, the security chip 120 is stacked on the memory chip 110. The memory chip 110 and the security chip 120 are packed together. The security chip 120 is provided for the memory chip 110 to ensure the information security. The memory chip 110 is provided for the security chip 120 to extend the data storing region for executing the security procedure.

The input-output pin PN11 and the control pin PN12 are used to connect an input-output pin PN21 and a control pin PN22 of the host 200 respectively. The security chip 120 is coupled between the memory chip 110 and the host 200. When the host 200 accesses the data in the memory chip 110, the security chip 120 manages the accessing operation and executes the security procedure if the security is required.

The security chip 120 includes a processing circuit 121, a first switch 122, a second switch 123, a first input-output pad P11, a second input-output pad P12, a first control pad P21 and a second control pad P22. The first input-output pad P11 is coupled to the input-output pin PN11, and the second input-output pad P12 is coupled to a third input-output pad P13 of the memory chip 110. The first control pad P21 is coupled to the control pin PN12, and the second control pad P22 is coupled to a third control pad P23 of the memory chip 110. The third input-output pad P13 of the memory chip 110 is not directly coupled to the input-output pin PN11, and the third control pad P23 of the memory chip 110 is not directly coupled to the control pin PN12.

To access the data storing in the memory chip 110, there are several paths formed from the host 200 to the memory chip 110. The security chip 120 can manage those paths to access the data with security function or access the data without security function.

The memory chip 110 and the security chip 120 may be arranged in different way. For example, please refer to FIG. 2, which shows a multi-chip package 100' and the host 200 according to another embodiment. In another embodiment, the memory chip 110 and the security chip 120 may be disposed on the same substrate without stacking with each other. In this embodiment, the security chip 120 is also coupled between the memory chip 110 and the host 200.

Figure 2:
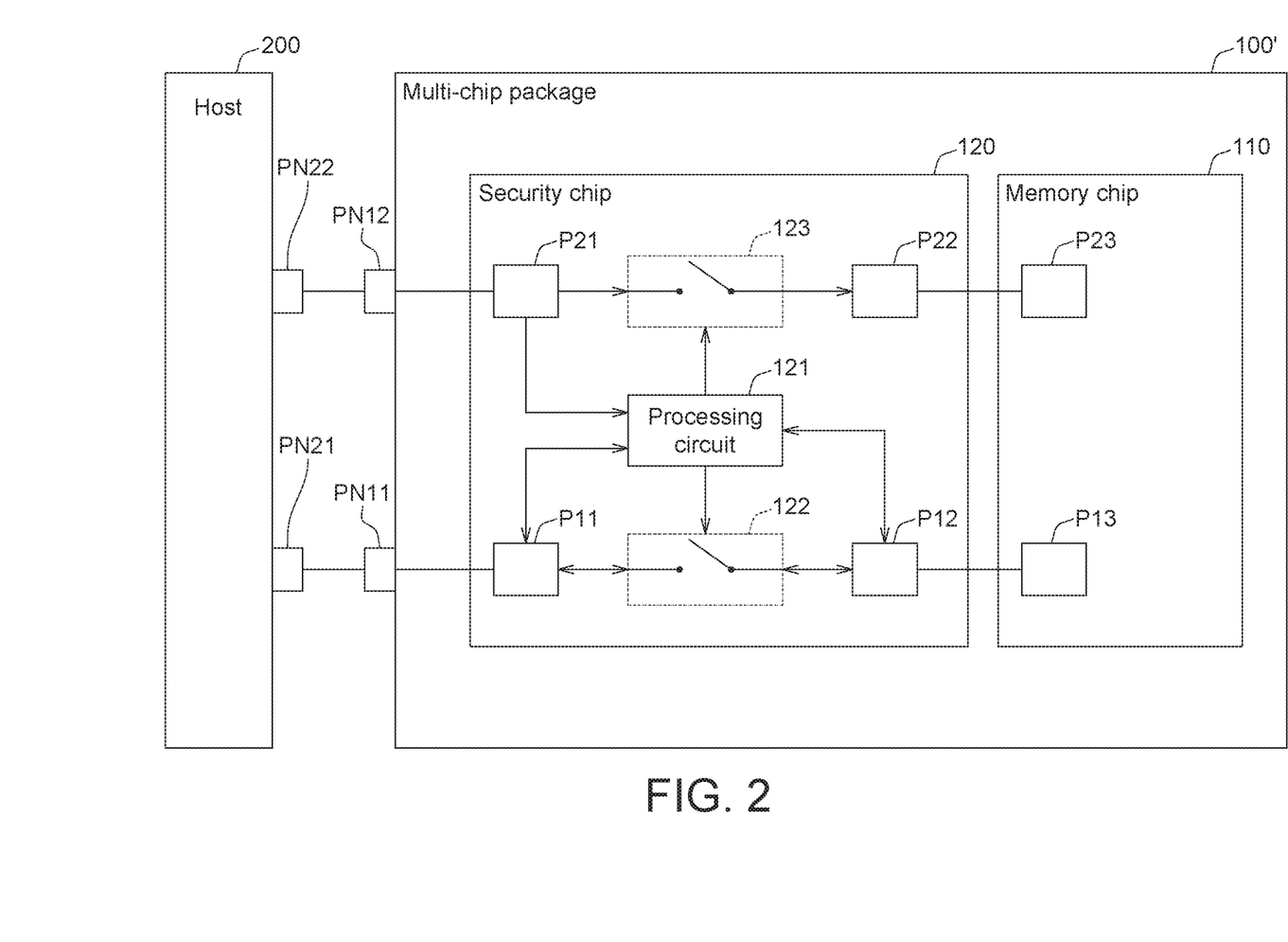
FIG. 2 shows a multi-chip package and the host according to another embodiment.

In this embodiment, the security chip 120 can manage those paths to access the data with security function or access the data without security function also. For detail illustrating the operation of the memory chip 110 and the security chip 120, a controlling method of the multi-chip package 100, 100' is illustrated via a flowchart.

Figure 3:
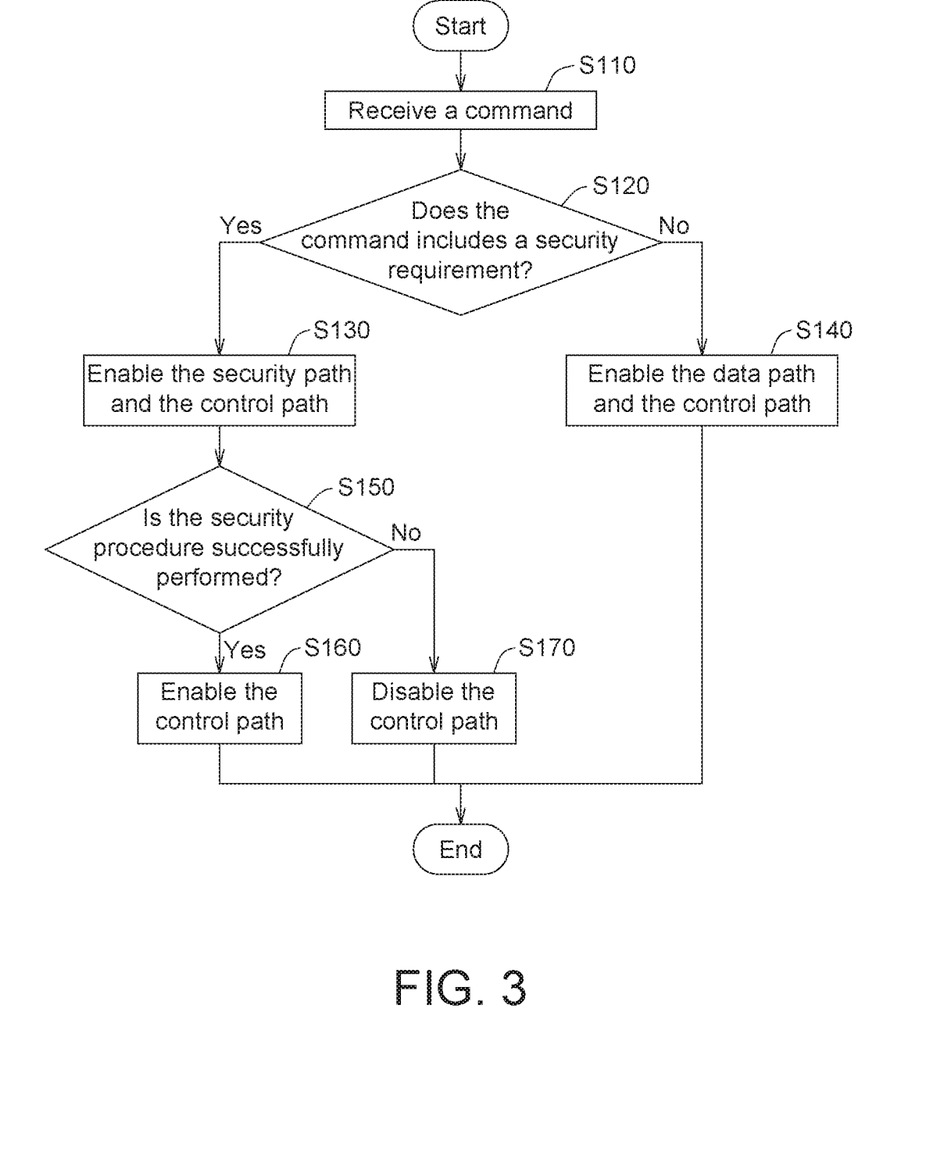
FIG. 3 shows a flowchart of the controlling method of the multi-chip package according to one embodiment.
Figure 4:
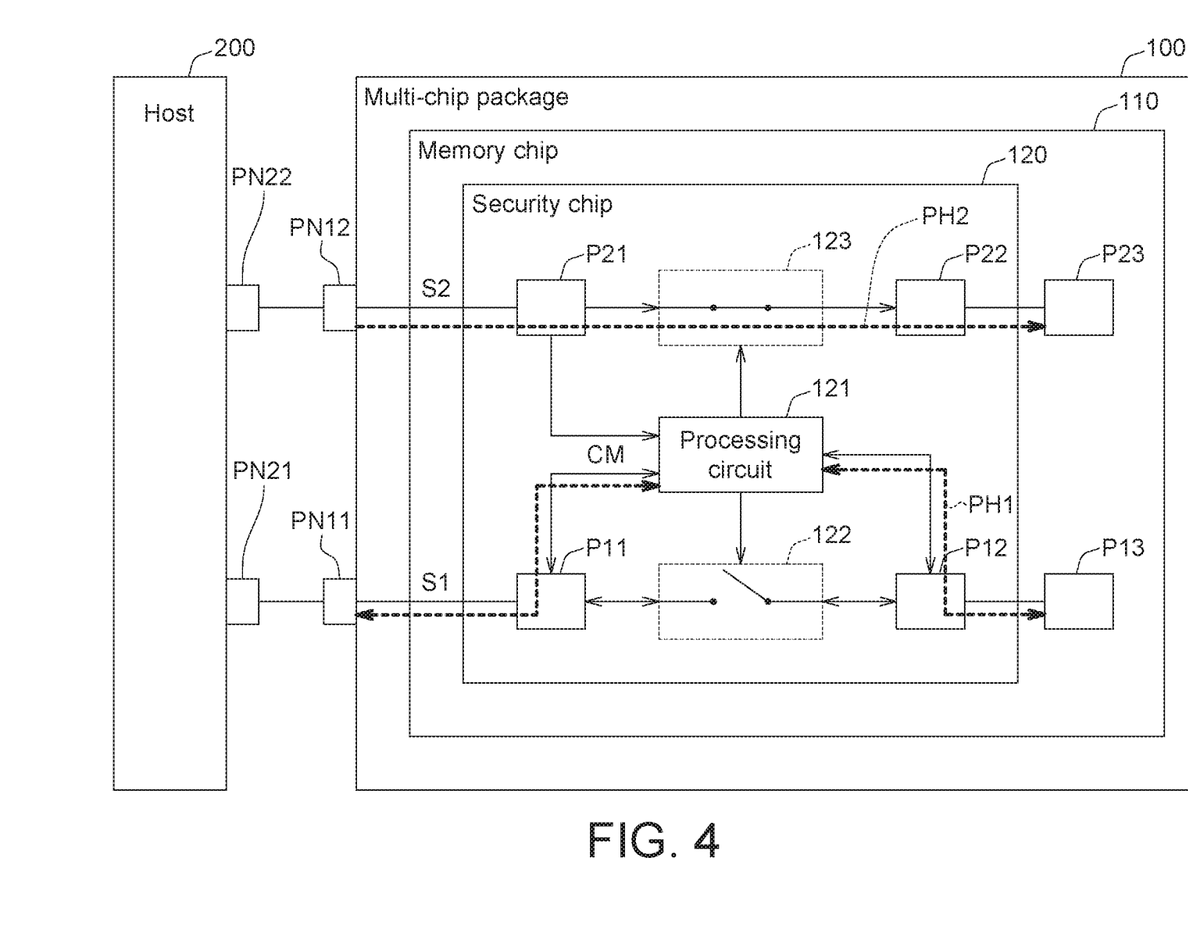
FIG. 4 illustrates the step S160 of FIG. 3.
Figure 5:
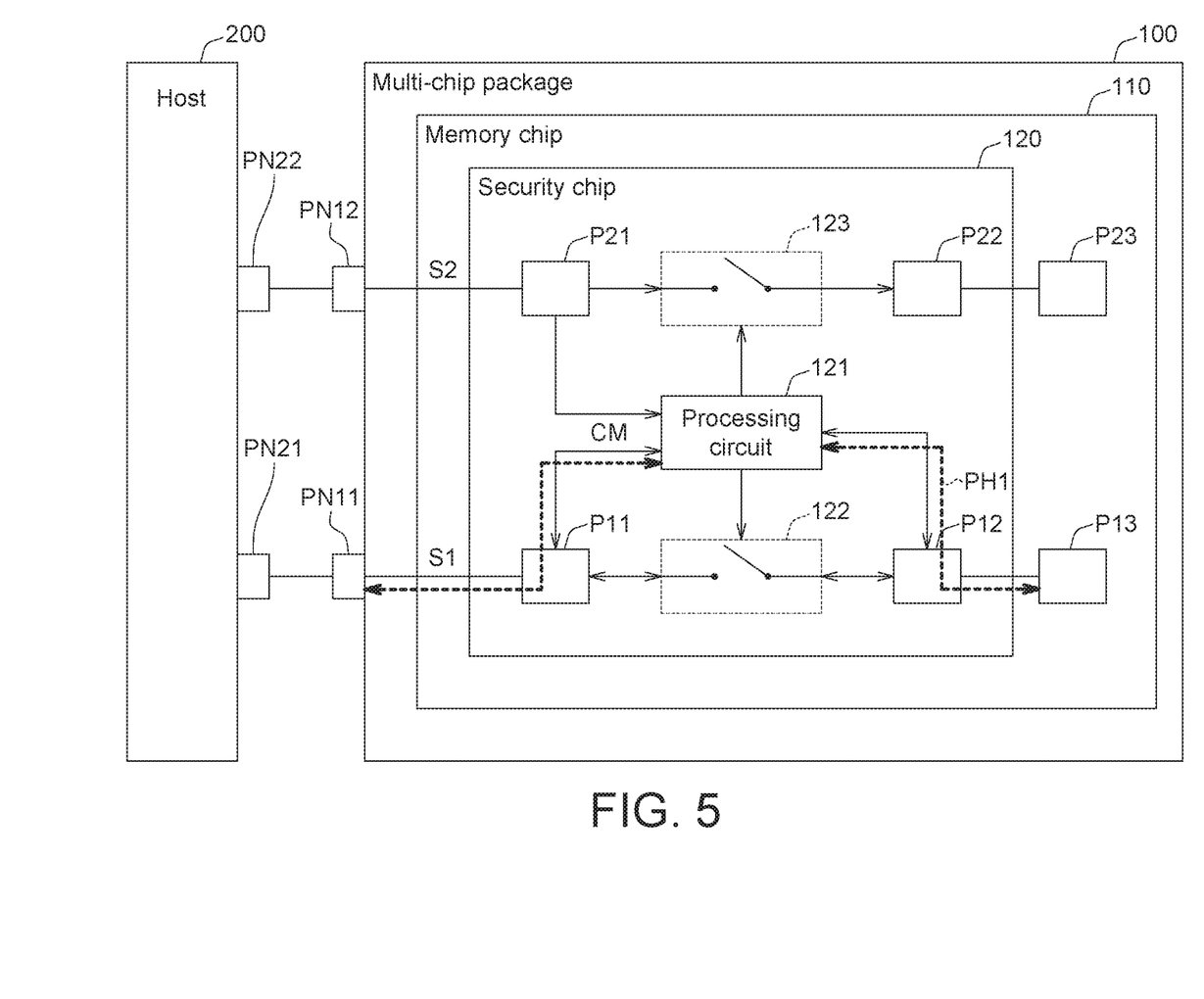
FIG. 5 illustrates the step S170 of FIG. 3.
Figure 6:
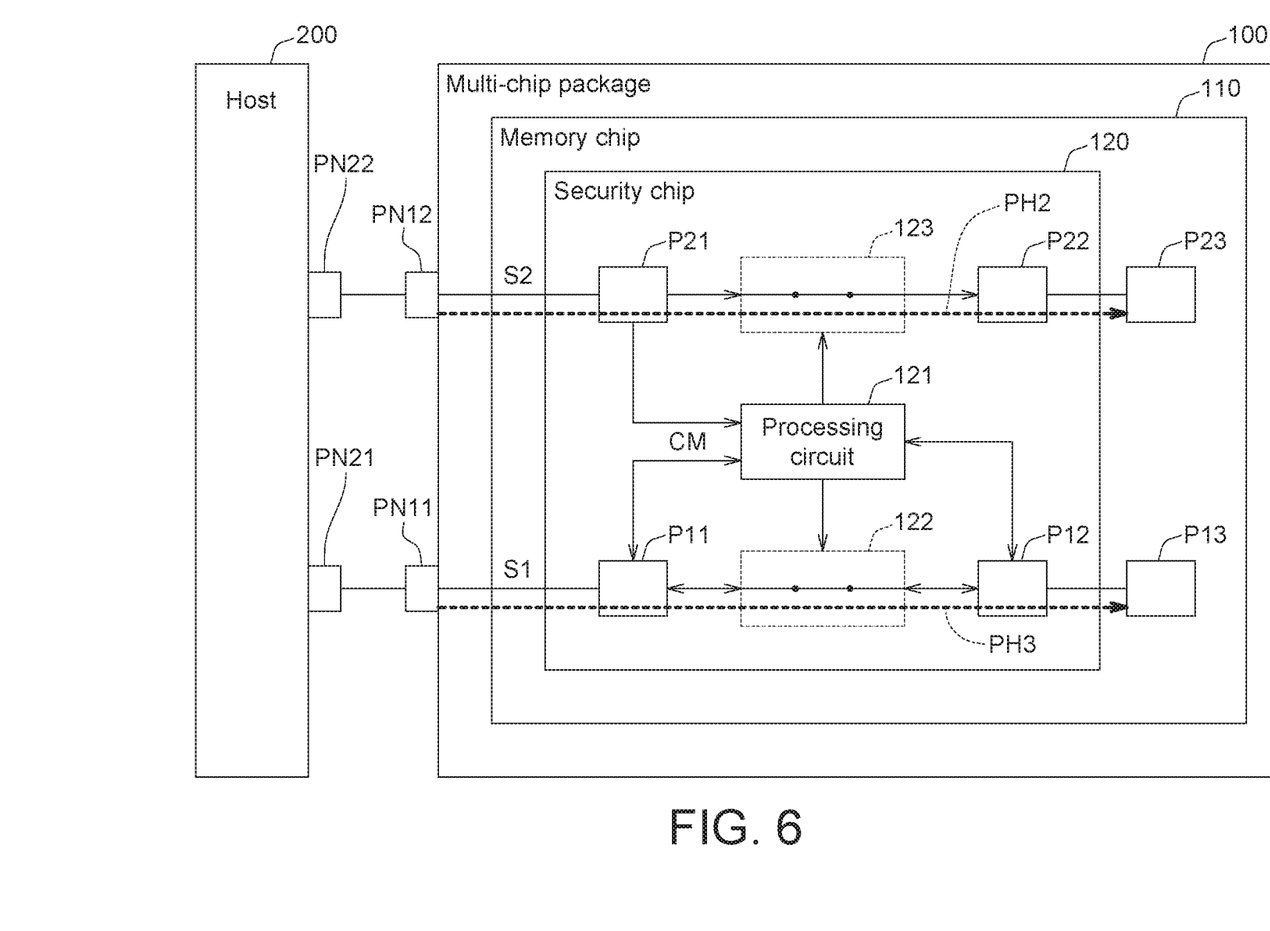
FIG. 6 illustrates the step S140 of FIG. 3.

Please refer to FIGS. 3 to 6. FIG. 3 shows a flowchart of the controlling method of the multi-chip package 100, 100' according to one embodiment, FIG. 4 illustrates the step S130 of FIG. 3, FIG. 5 illustrates the step S170 of FIG. 3, and FIG. 6 illustrates the step S140 of FIG. 3. In step S110, the processing circuit 121 of the security chip 120 receives a command CM from the host 200. The command CM may be transmitted to the processing circuit 121 through the input-output pin PN21, the input-output pin PN11 and the first input-output pad P11.

In step S120, the processing circuit 121 determines whether the command CM includes a security requirement. The command CM is decoded by the processing circuit 121 to know whether the command CM includes the security requirement or not. For example, the security requirement may be the authentication requirement, the encryption requirement or the decryption requirement. If the command CM includes the security requirement, then the process proceeds to step S130; if the command CM does not include the security requirement, then the process proceeds to step S140.

In step S130, referring to FIG. 4, the processing circuit 121 enables a security path PH1 and a control path PH2. In this step, the processing circuit 121 turns off the first switch 122, such that only the security path PH1 is formed between the first input-output pad P11 and the second input-output pad P12. The security path PH1 is used to input an input-output signal S1 into the processing circuit 121 for executing a security procedure and accessing the memory chip 110. The input-output signal S1 may be an IO signal of the Serial Peripheral Interface (SPI). The security procedure may be an authentication procedure, an encryption procedure or a decryption procedure. The data storing in the memory chip 110 is not directly transmitted to the host 200. If the command CM includes the security requirement, the corresponding security procedure will be executed before transmitting the data. As such, the information security can be ensured. Besides, in one embodiment, the host 200 may only request to execute the security procedure without reading any data from the memory chip 110. In this embodiment, the memory chip 110 can provide extra data region for executing the security procedure.

In step S150, the processing circuit 121 determines whether the security procedure is successfully performed. If the security procedure is successfully performed, then the process proceeds to step S160; if the security procedure is not successfully performed, then the process proceeds to step S170.

In step S160, referring to FIG. 4, the processing circuit 121 enables a control path PH2. In this step, the processing circuit 121 turns on the second switch 123, such that the control path PH2 is formed between the first control pad P21 and the second control pad P22. The control path PH2 is used to pass a control signal S2 to the memory chip 110. The control signal S2 may be a chip select (CS) signal, slave select (CS) signal, or Serial Clock (SCLK) signal of the SPI.

In step S170, referring to FIG. 5, the processing circuit 121 disables the control path PH2. In this step, the processing circuit 121 turns off the second switch 123, such that the control path PH2 is disabled. That is to say, the control path PH2 is enabled if the command CM includes the security requirement and the security procedure is successfully performed; the control path PH2 is disabled if the command CM includes the security requirement but the security procedure is not successfully performed.

In step S140, referring to FIG. 6, the processing circuit 121 enables a data path PH3 and the control path PH2. In this step, the processing circuit 121 turns off the first switch 122 and turns on the second switch 123, such that only the security path PH1 is formed between the first input-output pad P11 and the second input-output pad P12, and the control path PH2 is formed between the first control pad P21 and the second control pad P22. The data path PH3 is used to pass the input-output signal S1 to the memory chip 110, and the control path PH2 is used to pass the control signal S2 to the memory chip 110.

According to the embodiments described above, the security chip 120 can ensure the information security of the memory chip 110, and the memory chip 110 can provide extra data region for the security chip 120 to execute the security procedure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A controlling method of a multi-chip package, wherein the multi-chip package includes a memory chip and a security chip, and the controlling method comprises:
   receiving a command from a host by a processing circuit of the security chip, wherein at least a control path and a security path are formed between the host and the memory chip;
   enabling the security path to input an input-output signal into the processing circuit for executing a security procedure and accessing the memory chip, if the command includes a security requirement; and
   disabling the control path by a switch, if the command includes the security requirement but the security procedure is not successfully performed.

2. The controlling method according to claim 1, further comprising:
   enabling the control path to pass a control signal to the memory chip, if the command includes the security requirement and the security procedure is successfully performed.

3. The controlling method according to claim 1, wherein the security procedure is an authentication procedure, an encryption procedure or a decryption procedure.

4. The controlling method according to claim 1, further comprising:
   enabling a data path to pass the input-output signal to the memory chip, if the command does not include the security requirement.

5. The controlling method according to claim 4, further comprising:
   enabling the control path to pass a control signal to the memory chip, if the command does not include the security requirement.

6. The controlling method according to claim 5, wherein the input-output signal is an IO signal of a Serial Peripheral Interface (SPI), and the control signal is a chip select (CS) signal, slave select (SS) signal, or Serial Clock (SCLK) signal of the SPI.

7. A multi-chip package, comprising:
   a memory chip; and
   a security chip, wherein the security chip is coupled between the memory chip and a host, at least a control path and a security path are formed between the host and the memory chip, and the security chip includes:
a processing circuit for enabling the security path to input an input-output signal into the processing circuit for executing a security procedure and accessing the memory chip, if a command is received by the processing circuit and the command includes a security requirement, and disabling the control path by a switch, if the command includes the security requirement but the security procedure is not successfully performed.

8. The multi-chip package according to claim 7, wherein the processing circuit is further for enabling the control path to pass a control signal to the memory chip, if the command is received by the processing circuit, the command includes the security requirement and the security procedure is successfully performed.

9. The multi-chip package according to claim 7, wherein the processing circuit is further for enabling a data path to pass the input-output signal to the memory chip, if the command is received by the processing circuit and the command does not include the security requirement.

10. The multi-chip package according to claim 9, wherein the processing circuit is further for enabling the control path to pass a control signal to the memory chip, if the command is received by the processing circuit and the command does not include the security requirement.

11. The multi-chip package according to claim 10, wherein the input-output signal is an IO signal of a Serial Peripheral Interface (SPI), and the control signal is a chip select (CS) signal, slave select (SS) signal, or Serial Clock (SCLK) signal of the SPI.

12. The multi-chip package according to claim 7, further comprising:
an input-output pin used for coupling to the host,
wherein the security chip further includes:
a first input-output pad coupled to the input-output pin; and
a second input-output pad coupled to a third input-output pad of the memory chip.

13. The multi-chip package according to claim 12, further comprising:
a control pin used for coupling to the host,
wherein the security chip further includes:
a first control pad coupled to the control pin; and
a second control pad coupled to a third control pad of the memory chip.

14. A security chip, comprising:
a processing circuit for enabling a security path to input an input-output signal into the processing circuit for executing a security procedure and accessing a memory chip, if a command is received from a host by the processing circuit and the command includes a security requirement, wherein at least a control path and the security path are formed between the host and the memory chip;
wherein the processing circuit disables the control path by a switch, if the command includes the security requirement but the security procedure is not successfully performed.

15. The security chip according to claim 14, wherein the processing circuit is further for enabling the control path to pass a control signal to the memory chip, if the command is received by the processing circuit, the command includes the security requirement and the security procedure is successfully performed.

16. The security chip according to claim 14, wherein the processing circuit is further for enabling a data path to pass the input-output signal to the memory chip, if the command is received by the processing circuit and the command does not include the security requirement.

17. The security chip according to claim 16, wherein the processing circuit is further for enabling the control path to pass a control signal to the memory chip, if the command is received by the processing circuit and the command does not include the security requirement.

18. The security chip according to claim 17, wherein the input-output signal is an IO signal of a Serial Peripheral Interface (SPI), and the control signal is a chip select (CS) signal, slave select (SS) signal, or Serial Clock (SCLK) signal of the SPI.

19. The security chip according to claim 14, further comprising:
a first input-output pad coupled to an input-output pin for connecting the host; and
a second input-output pad coupled to a third input-output pad of the memory chip.

20. The security chip according to claim 14, further comprising:
a first control pad coupled to a control pin used for connecting the host; and
a second control pad coupled to a third control pad of the memory chip.

* * * * *